UNITED STATES PATENT OFFICE.

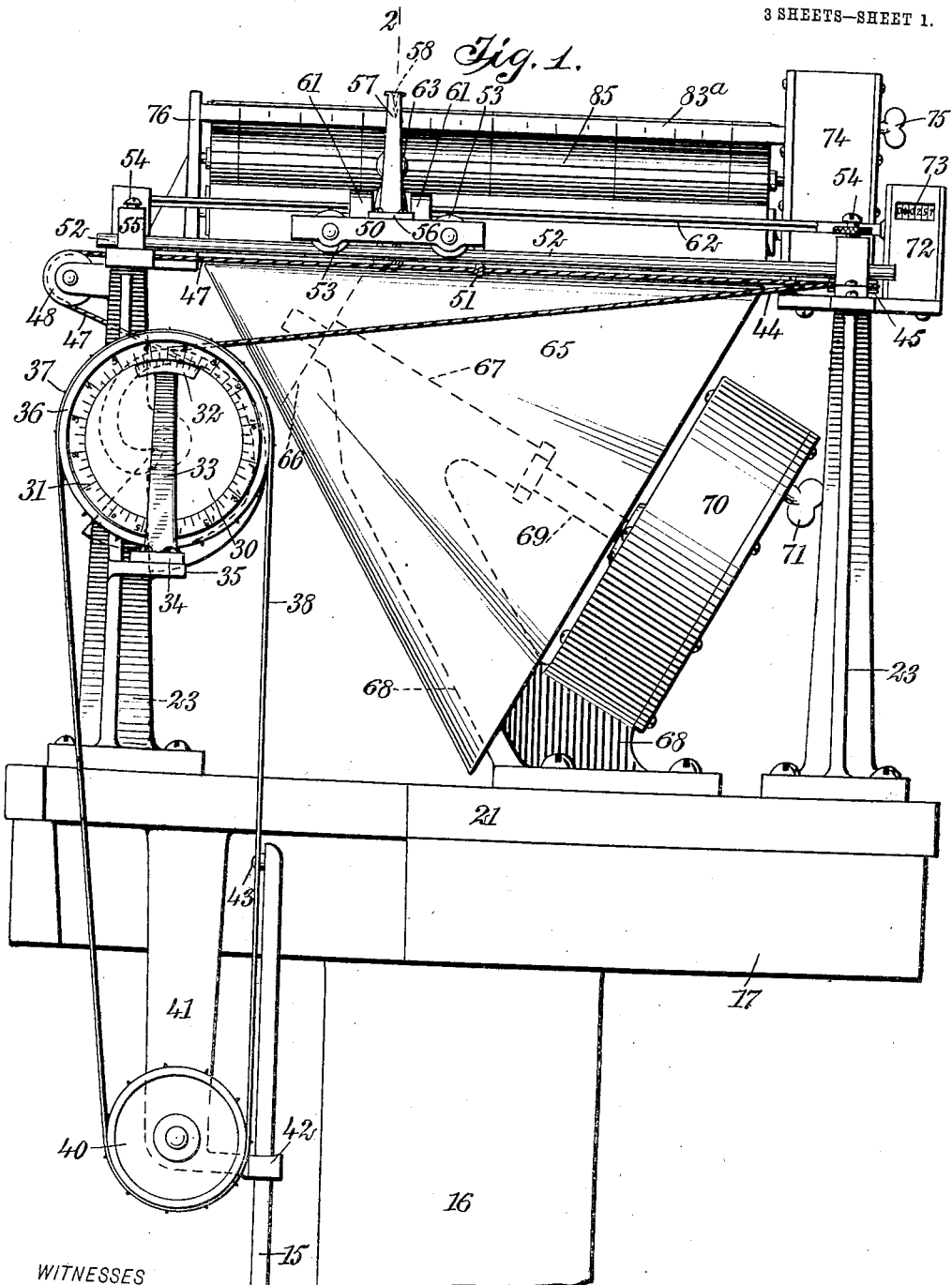

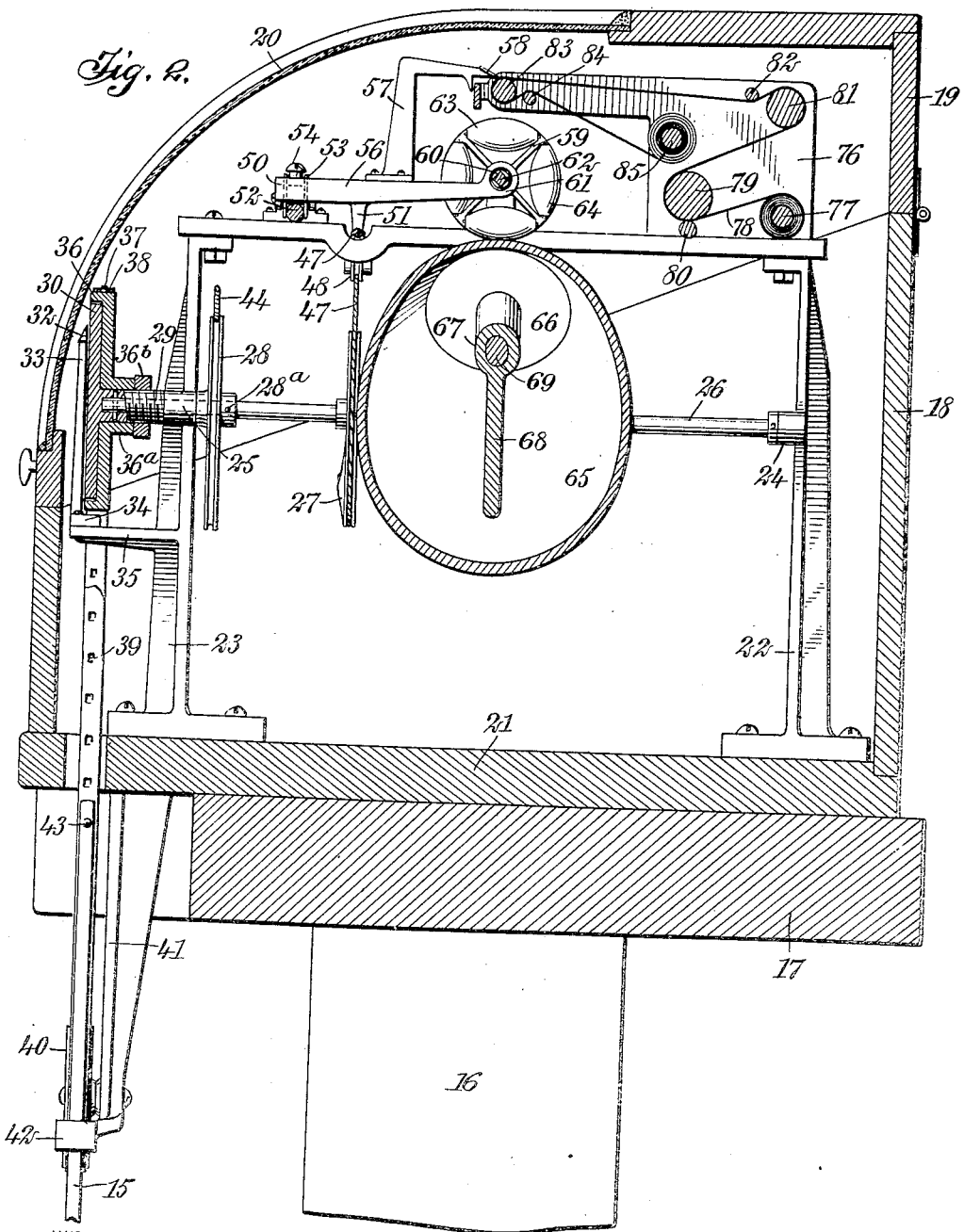

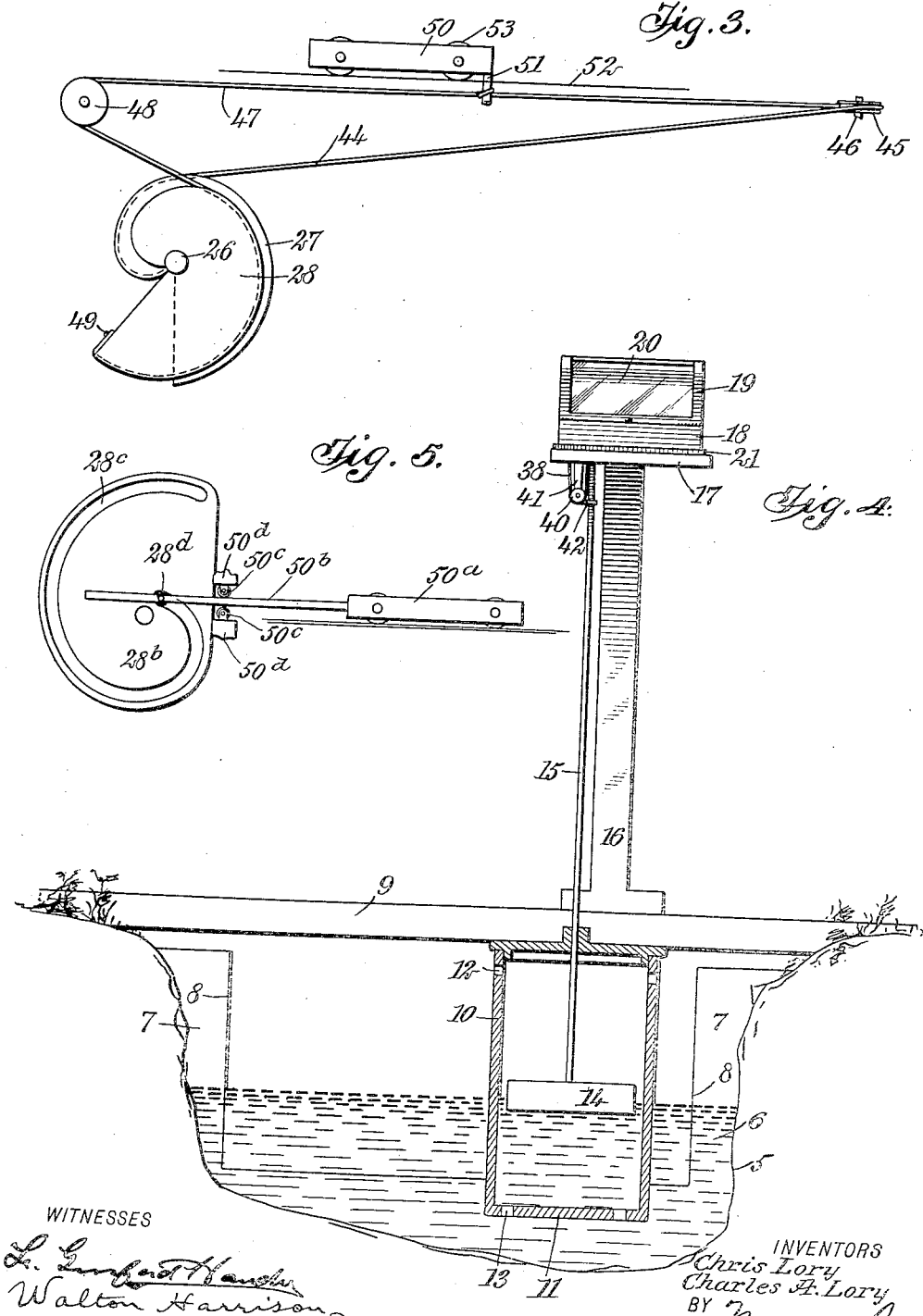

CHRIS LORY, OF NEW WINDSOR, AND CHARLES A. LORY, OF FORT COLLINS, COLORADO.

WATER-METER.

No. 918,176.  Specification of Letters Patent.  Patented April 13, 1909.

Application filed June 10, 1907. Serial No. 378,253.

*To all whom it may concern:*

Be it known that we, CHRIS LORY and CHARLES A. LORY, both citizens of the United States, and residents, respectively, of New Windsor, in the county of Weld and State of Colorado, and of Fort Collins, in the county of Larimer and State of Colorado, have invented a new and Improved Water-Meter, of which the following is a full, clear, and exact description.

Our invention relates to meters, our more particular object being to produce a type of meter for indicating and recording the volume of water flowing through an irrigation ditch, a weir or a flume.

Our invention makes use of the fact that there is a definite relation between the rate of discharge and the varying depth of the water, this rate of discharge being different in different instances, yet capable of being calculated from measurements or appropriate weir formulæ.

From the known relation between rate of discharge and depth of liquid, we construct an integrating or calculating cam hereinafter described, and use this cam to control the position of a carriage carrying a marker, the position of the carriage and marker being controllable by the depth of the liquid, and the marker being employed to make a continuous line record upon a time-controlled movable record sheet.

In the integrating or calculating cam the angular distance represented by the spiral outline or boundary of the cam is proportional to the depth of water and the radial vector is proportional to the discharge. The design of the cam is such that one complete revolution of it covers the full range of discharge for the weir or channel for which it is intended. For instance, for a weir of trapezoidal cross section, or a weir having a rectangular cross section, or a submerged weir, or for a flume or an open channel, the curve of the cam periphery will vary more and more from that of a logarithmic spiral. This cam is rotated when the water rises or falls, this result being attained by movements of a float, the motion being transmitted to the peripheral surface of the cam, as hereinafter explained, so that the float resting at different levels acts upon the cam with varying degrees of leverage, the length of the radii being different for different positions of the cam.

Reference is to be had to the accompanying drawings forming a part of this specification, in which similar characters of reference indicate corresponding parts in all the figures.

Figure 1 is a fragmentary front elevation of the working parts of the meter, these parts being shown as located upon the capital of a supporting column, and including a time-controlled revolving cone serving as a driving member, and a float-controlled carriage provided with the marker and with mechanism connected with a comptometer for registering the virtual revolutions of the cone and consequently the flow of water; Fig. 2 is a vertical cross section upon the line 2—2 of Fig. 1 looking in the direction of the arrow, and showing at the left a device for indicating the depth of the liquid, and showing at the top of the figure the carriage carrying the marking mechanism, and showing upon the carriage a roller wheel and accompanying parts for transmitting motion from the revolving cone to the comptometer; Fig. 3 is a front elevation, partly diagrammatic, showing the carriage and the cam mechanism and parts associated therewith for moving the carriage; Fig. 4 is a reduced front elevation showing the casing containing the working parts of the meter, and mounted upon the supporting column, and further showing the float, the casing of the latter being in section; and Fig. 5 is a front elevation partly diagrammatic, showing a slightly different form of cam mechanism and connections therefrom to the carriage.

An irrigation ditch is shown at 5 and a body of water flowing therethrough at 6.

At 7 is a weir provided, as usual, with an opening 8, the purpose of this weir with its opening being to so direct the flow of the water as to permit of ready measurement of its depth, as compared with its speed. In other words, it is to give a part of the ditch a shape serving as a definitive basis of operations. A beam 9 rests directly across the irrigation ditch and depending from this beam is a casing 10 having a bottom 11. Apertures 12, 13 are provided to permit the ingress and egress of air and water, in order that the water inside of the casing may have a level representative of that of the water outside of the casing.

A float 14 rests upon the water within the casing and is free to move up and down in accordance with differences in the water level. Extending upwardly from the float 14 is a rod 15. A supporting column 16 is provided with a capital 17 upon which rests a casing 18 provided with a cover or lid 19, this casing being for the purpose of inclosing the working parts and the lid being provided in order to facilitate access to these working parts. For convenience the lid 19 is provided with a window 20, preferably of curved glass and through which the operation of the inclosed mechanism may readily be observed.

Mounted upon a base 21 are standards 22, 23, constituting parts of a general framework. Bearings 24, 25 support a revoluble shaft 26 upon which are mounted cams 27, 28. By means of set screws 28$^a$ these cams may be set in different positions relatively to the shaft 26, in order to accommodate the instrument to different conditions.

A disk 30 is provided with a threaded hub 29, the latter being keyed firmly upon the shaft 26, the disk 30 being thus turned thereby. The disk 30 is provided with an annular scale 31 (see Fig. 1) for indicating its position relatively to other parts. A stationary pointer 32, having preferably the form of a vernier member (see Fig. 1) is mounted upon a stationary pointer arm 33, the latter being provided with a base 34 secured rigidly upon a shoulder 35. A revoluble disk 36 is provided with a hub 36$^a$ of annular form adapted to be engaged by a revoluble nut 36$^b$ threaded upon the hub 29. By loosening the nut 36$^b$ the disk 36 may be adjusted relatively to the disk 30 and by tightening the nut 36$^a$ its relative adjustment may be maintained until the operator desires to change it.

In Fig. 5 the carriage is shown at 50$^a$ and mounted upon it is a rod 50$^b$ which engages antifriction rollers 50$^c$ mounted upon stationary brackets 50$^d$. The cam 28$^b$ is provided with a spiral groove 28$^c$ in which works the roller 28$^d$. The turning of the cam 28$^b$ controls the position of the carriage 50$^a$ to the right or left, the general result being much the same as with the apparatus shown in Fig. 3. The adjustment being once made, the disks 30, 36, together with the shaft 26, are adapted to turn as a unit, so that any revoluble movement of the shaft 26 in either direction, is shown at once by the indicator. The disk 36 is provided with sprocket studs 37 and is partially encircled by a belt 38, preferably of metal, provided with sprocket holes 39 mating the sprocket studs 37. A sprocket pulley 40 is mounted upon a hanger 41 and disposed below the capital 17. This sprocket pulley engages the belt 38. The lower end of the hanger 41 is provided with a guide 42 through which the rod 15 passes loosely. The rod 15 is connected with the band 38 by a fastening 43 and by this arrangement vertical movement of the rod 15 is communicated to the band. One run, 44, of a wire or equivalent flexible connection, is partially wound upon the spiral cam 27 and passes around a pulley 45 mounted upon a stub shaft 46, and the other run, 47, of said wire similarly passes around a pulley 48 and is partially wound upon the cam 28, being secured thereto by a fastening 49. At 50 is shown a carriage which is provided with a depending lug 51 to which the runs 44 and 47 of the wire are secured. Each cam 27, 28 is what we call a calculating or integrating cam, its peripheral curve having a relation to the rate of flow of water through the weir. The curvature of the cams 27, 28 is so plotted out that the total aggregate length of the cords unwound from the cams is constant. That is to say, as a cord unwinds from one of the cams another cord is wound upon the other cam, the total length of both cords being thus maintained constant in order that strains upon the cord shall not vary when the cams are turned in either direction. The carriage 50 is provided with track wheels 53 which engage a rod 52 serving as a track. This rod may be adjusted by means of screws 54 and for this purpose is mounted in bearings, one of which is shown at 55. The carriage 50 is provided with an arm 56 projecting laterally and rearwardly from the carriage. Mounted upon this arm is a bracket 57 provided with a marker 58, which may be a pencil or a stylus as desired.

A wheel 59 (see Fig. 2) is provided with a hub 60 which is journaled in bearings 61 carried by the arm 56. A square shaft 62 extends directly through the hub 60, the latter being thus splined thereupon, so as to permit of movement of the wheel 59 along the axis represented by the square shaft 62. Journaled upon the wheel 59 are rollers 63, 64 substantially lozenge shape, these rollers being each revoluble upon its own axis and yet adapted to revolve bodily endwise around the shaft 62 as a center. Owing to the curvature of the rollers 63 and 64, the general contour of the wheel 59 and rollers is a true circle. The wheel 59 with its rollers 63 and 64 and accompanying parts we designate as a roller wheel.

A revoluble cone 65, constituting a driving gear, is provided internally with a disk 66 secured to the cone and serving as a bearing member therefor, said bearing member engaging a fixed bearing member 67 of annular form, the latter member being integral with a bracket 68. A driving shaft 69 extends through the bearing 67 and is rigidly secured to the disk 66. When the driving shaft 69 is turned, the cone 65 is caused to revolve. The driving shaft 69 is connected with and driven by a motor 70, the latter being wound up after the manner of a clock by aid of a winding stem 71. A comptometer is shown at 72 and is provided with numbering wheels 73 for indicating the flow of water. A spring motor 74 is provided with a winding stem 75 and disposed oppositely to this spring motor is a plate 76. Partially wound upon a roller 77 is a record band 78, the latter passing partially around a roller 79, adjacent to which is a guide rod 80. A graduated scale 83ᵃ is disposed under the marker 58 so that at any given moment an observer can note the rate of discharge as well as the depth and without referring to the permanent record.

After leaving the roller 79 the record band passes partially around a roller 81, thence beneath a guide rod 82, next around a roller 83, thence over a guide rod 84 to a roller 85. The roller 77 is turned by the spring motor 74, and the record band is gradually wound upon the roller 77 and unwound from the roller 85. The passage of the paper record, taken in connection with the pressure of the marker 58, causes a continuous line to be marked upon the record.

The operation of our invention is as follows: The proportions of the cams 27, 28 having been worked out in accordance with the requirements of a particular location, and the apparatus having been duly installed, the operator next measures the depth of water passing through the weir. Suppose he finds it to be four feet. He next loosens the nut 36ᵇ (Fig. 2), and adjusts the disks 30, 36 relatively to each other, so that the indicator, shown at the left of Fig. 1, will register a depth of four feet. Any subsequent rise or fall of the water passing through the weir will of course be shown by this indicator. In adjusting the disks 30, 36 relatively to each other, the operator necessarily moves the carriage 50 to a proper distance, corresponding to this relative adjustment, and therefore corresponding to the depth of water in the weir. The spring motor 70 being next thrown into action causes the cone 65 to turn and the rotation of this cone is always at a constant rate of speed. If, now, the water in the weir becomes deeper, the float 14 rises and carries the rod 15 upward, thus causing the band 38 to turn the disks 30, 36 in a contra-clockwise direction, according to the view shown in Fig. 1. This causes the cams 26, 27 (see Fig. 3) to turn in a contra-clockwise direction, the result being that the carriage 50 is moved to the right. A fall of the water passing through the weir similarly causes the carriage 50 to move to the left. In executing these movements, the carriage shifts the general position of the roller wheel 59 to the right or to the left, according to whether the level of the water be rising or falling. The higher the water rises, the further to the right the roller wheel is carried. Now, since the number of turns of the cone 65 is always constant for a given length of time, it follows that the farther the carriage 50 is moved to the right, according to Fig. 1, the larger must be the diameter of that part of the cone 65 engaging the rollers 63, 64 (see Figs. 1 and 2). The rotation of the cone causes the roller wheel 59 to turn. The rollers 64 have, as a general rule, comparatively little movement upon their own axes. The reason why they are made revoluble upon their own axes is merely to avoid undue frictional drag upon the cone 65 when the carriage is shifted. As a matter of fact, the carriage may remain stationary for hours and in this case the rollers 64 have no movement except the general turning movement of the wheel 59.

From the above it will be seen that the number of revolutions of the square shaft 62 for a given length of time is controlled by the depth of water passing through the weir, and consequently that if the cams 27, 28, and other parts, are properly proportioned, the water flowing through the weir should be registered faithfully by the comptometer 72. It is also apparent that at any particular moment the depth of water passing through the weir may be ascertained by a glance at the indicator shown at the left of Fig. 1. It is further apparent that as the record sheet 78 moves at a uniform rate of speed, the marker 58 must leave upon this record sheet a mark which may represent the resultant of the depth of water passing through the weir at each and every given moment, and also similarly indicate the depth of the water. For convenience in interpreting the record, it is ruled transversely for prime integrals and longitudinally for discharge rates. That is to say, the ordinates and abscissæ of the record band are so arranged that the lengths of the marks along the general direction of the length of the band indicate time, and the displacement of the marks relatively to the longitudinal edges of the band represents the rate of flow of water through the weir, the rate being reckoned, we will say, in cubic feet, or other units of volume.

It will be noted that the invention above described may be applied to any channel having a definite permanent cross section of any form.

Having thus described our invention, we claim as new and desire to secure by Letters Patent:

The combination of a carriage, means controllable by changes in water level, for shifting said carriage into different positions, a revoluble member mounted upon said carriage, a comptometer connected with said revoluble member and actuated thereby, rollers mounted upon said revoluble member in order to facilitate the travel of the carriage, and a conical driving member engaging said rollers for the purpose of turning said revoluble member.

In testimony whereof we have signed our names to this specification in the presence of two subscribing witnesses.

CHRIS LORY.
CHAS. A. LORY.

Witnesses:
RALPH L. PARSHALL,
JOHN H. V. FINNEY.